(12) United States Patent
Stevens et al.

(10) Patent No.: US 10,127,791 B2
(45) Date of Patent: Nov. 13, 2018

(54) INTERNET OF THINGS (IOT) EVENT DISTRIBUTION

(71) Applicant: Verizon Patent and Licensing Inc., Arlington, VA (US)

(72) Inventors: Ira Stevens, New Boston, NH (US); William D. Walker, Hollis, NH (US); William J. Hayes, Tewksbury, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/451,656

(22) Filed: Mar. 7, 2017

(65) Prior Publication Data

US 2018/0261070 A1    Sep. 13, 2018

(51) Int. Cl.
*G08B 21/18* (2006.01)
*H04L 29/08* (2006.01)

(52) U.S. Cl.
CPC ............. *G08B 21/18* (2013.01); *H04L 67/12* (2013.01)

(58) Field of Classification Search
CPC ................................ G08B 21/18; H04L 67/12
See application file for complete search history.

(56) References Cited

U.S. PATENT DOCUMENTS

| | | | |
|---|---|---|---|
| 2015/0222621 A1* | 8/2015 | Baum | H04W 4/70 726/9 |
| 2016/0308861 A1* | 10/2016 | Ameling | H04L 63/0876 |
| 2017/0026472 A1* | 1/2017 | Bugenhagen | H04L 67/12 |
| 2017/0134553 A1* | 5/2017 | Jeon | H04W 4/70 |
| 2017/0171728 A1* | 6/2017 | Aiuto | H04W 76/10 |
| 2017/0279631 A1* | 9/2017 | Britt | H04L 12/2816 |
| 2017/0346836 A1* | 11/2017 | Holland | H04L 63/1416 |
| 2018/0048710 A1* | 2/2018 | Altin | H04W 76/10 |

* cited by examiner

*Primary Examiner* — Erin M File

(57) ABSTRACT

The processing and management of IoT events, in a manner that provides an intuitive and user-friendly design pattern, is described, and may include determining a set of IoT events, corresponding to a set of IoT devices, wherein an IoT event for a particular IoT device corresponds to a state or change of state of the received data for the particular IoT device. User-defined triggers may be evaluated, in which each of the triggers include a conditional expression that is evaluated using one or more of the IoT events. The triggers may generate alerts, which may be routed to a target which determines the actions that may be performed.

20 Claims, 9 Drawing Sheets

INTERNET OF THINGS (IOT) EVENT DISTRIBUTION

BACKGROUND

Wireless networks, such as cellular wireless networks, may be used as a platform for Internet of Things (IoT) connectivity, which may also be referred to as "cellular-based IoT" (CIoT). The extensive footprint, high reliability, and security features of wireless cellular networks can be ideal for servicing IoT devices.

IoT devices may include sensor devices (e.g., a temperature sensor, a utility meter reading device, etc.) that are designed to take a measurement and then upload the measurement. Many IoT devices perform relatively infrequent small data transmissions and use relatively low bandwidth.

Existing cloud-based IoT platforms provide services to users of IoT devices. For example, an IoT platform may provide an always-on connection to a variety of communication networks to receive communications from the IoT devices. The IoT platform may provide data buffering for communications from the IoT devices, dashboards through which users can view and manage their IoT devices, and developer services through which users or developers can customize how data obtained by a user's IoT device is processed.

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the appended claims and their equivalents.

Techniques described herein enable the control of IoT devices and processing of IoT data in a manner that provides an intuitive and user-friendly design pattern. In some implementations, users, which may include developers or relatively non-technical end-users, may be provided with an interface through which the users may define events based on data from various IoT devices, group events into related classes of events, assign triggers based on the events, and assign alerts based on the triggers. The triggers and events may be defined in a modular and customizable way, allowing end-users to flexibly manage and use their IoT devices. Additionally, users may intuitively associate alerts with actions that are performed using target resources.

Figure 1:
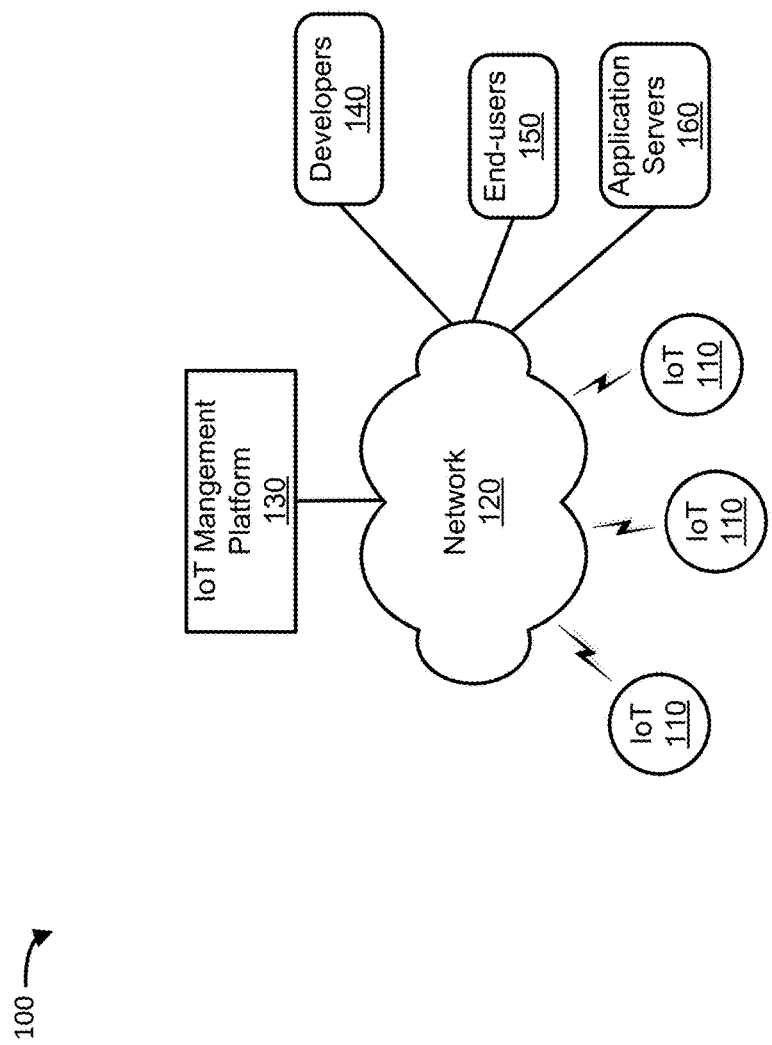
FIG. 1 is a diagram illustrating an example system in which systems and/or methods described herein may be implemented.

FIG. 1 is a diagram illustrating an example system 100 in which systems and/or methods described herein may be implemented. As illustrated, system 100 may include a number of IoT devices 110, which may obtain network connectivity from a network 120. IoT devices may include communication devices that obtain data, such as environmental data obtained via sensors associated with IoT devices 110, and transmit the data to IoT management platform 130. In general, IoT management platform 130 may provide services relating to the receiving, storing, filtering, and analyzing of IoT data. A number of different classes of "users" may interact with IoT management platform 130, such as developers 140, end-users 150, and application servers 160.

Each IoT device 110 may include User Equipment (UE) or another device, that may implement one or more sensing circuits and a communication circuit. The sensing circuit may include, for example, a temperature sensor, a humidity sensor, a light sensor, a camera, a video camera, a geo-positioning element (e.g., a GPS component), and/or other sensors that generate or monitor data that relates to the environment of IoT device 110. IoT devices 110 are often implemented as low-power, battery-operated devices. The communication circuit may implement wireless or wired communications that IoT device 110 may use to transmit the sensed data to another IoT device and/or to network 120. For example, the communication circuit may include a cellular radio. In some implementations, IoT devices 110 may also include wearable communication devices (e.g., wearable watches) and/or smartphones.

Network 120 may include one or more communication networks, such as a cellular communication network (e.g., a Third Generation Partnership Project (3GPP) based network), a wireless ad-hoc network, a local area network (LAN), a wired network, an IP-based packet data network (PDN), a wide area network (WAN) such as the Internet, a private enterprise network, and/or one or more other networks. Network 120 may be connected to one or more other networks, such as a public switched telephone network (PSTN), a public land mobile network (PLMN), and/or another network.

IoT management platform 130 may include one or more computing devices, such as server devices, that are co-located or geographically distributed. As will be described in more detail below, IoT management platform 130 may generally operate to implement processes to enable developers 140 and end-users 150 to manage and control IoT devices 110. In one implementation, a Representational State Transfer (REST) design pattern may be implemented to allow users to access and manipulate resources using a uniform and predefined set of stateless operations. The RESTful API may be used, for example, to group events generated by IoT devices, managed by a particular user, into a class, and define triggers based on the events of a class. The evaluation of a trigger may result in the generation of an alert (e.g., if the trigger evaluates to a logical true state). Additionally, a user may also define classes for alerts, and may potentially associate multiple alerts for each alert class. Targets may be associated with each alert class, where a target may refer to a resource that performs a operation (e.g., an action such as sending an email, outputting an audible or visual indication to a user, updating a customer database, etc.).

Developers 140 may include, or broadly refer to, users that develop software that is to be run by IoT management platform 130. Developers 140 may also include employees of the company or may be outside developers that develop applications, using APIs, exposed by IoT management platform 130, that use data obtained by IoT devices 110. End-users 150 may include, or generally refer to, users that use IoT management platform to manage and/or interact with IoT devices of the users. For example, a vending machine company may install IoT devices in vending machines to monitor the state of the vending machines that are operated by the company. In this situation, the vending machine company and/or employees of the vending machine company may be considered to be end-users 150.

Application servers 160 may include one or more computing devices, associated with developers 140 and/or end-users 150, that receive IoT data, such as from IoT management platform 130 (or directly from IoT devices 110), and operate on the data. For example, in the example of the vending machine company, the company may implement an application server 160 that monitors, based on IoT data, inventory of the vending machines. In some implementations, the functionality of an application server 160 may be performed by IoT management platform 130. Thus, for example, the vending machine inventory management application may be designed using the APIs provided by IoT management platform 130 and hosted by IoT management platform 130.

The quantity of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1. Alternatively, or additionally, one or more of the devices of system 100 may perform one or more functions described as being performed by another one or more of the devices of system 100.

Figure 2:
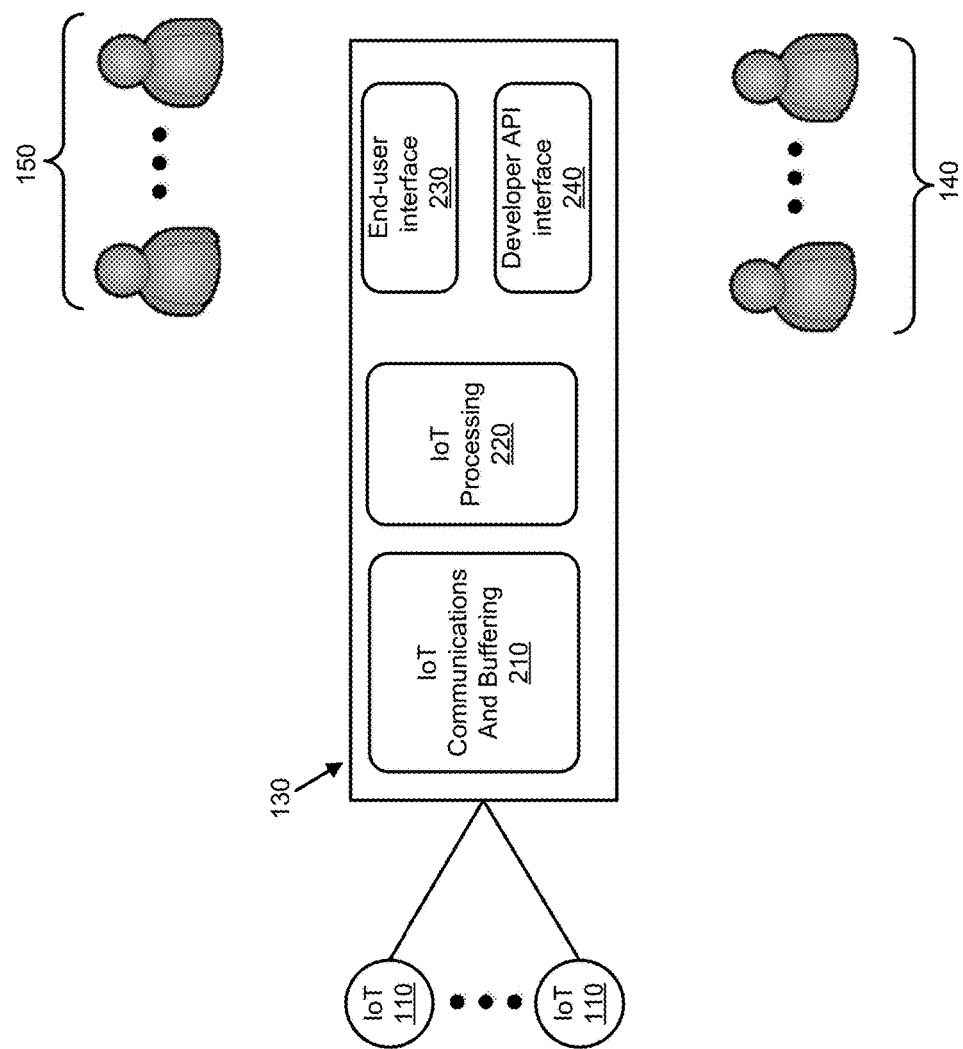
FIG. 2 is a diagram illustrating an example of functional components of an IoT management platform.

FIG. 2 is a diagram illustrating an example of functional components of IoT management platform 130. As shown, IoT management platform 130 may include IoT communications and buffering logic 210, IoT processing logic 220, end-user interface 230, and developer API interface 240.

IoT communications and buffering logic 210 may include communication interfaces, such as wired and/or wireless transceiver circuits, to connect to network 120. IoT communications and buffering logic 210 may receive IoT control information from IoT devices 110. Additionally, IoT communications and buffering logic 210 may receive substantive data, such as information that is measured and reported, from IoT devices 110. Each IoT device 110 may be associated with one or more end-users 150 (or developers). IoT communications and buffering logic 210 may store (e.g., buffer) the control and management information, and/or the substantive data, from IoT devices 110. The buffering logic may include one or more computer readable media, implemented as a database and/or other set of data structures. IoT communications and buffering logic 210 may deliver the buffered data to end-user 150 when the end-user connects to IoT communications and buffering logic 210. IoT management platform 130 may be redundantly designed to be provide high uptime, and thus, by buffering data from IoT devices 110, may allow end-users 150 to be intermittently connected to network 120 without fear of losing data from their IoT device 110.

IoT processing logic 220 include one or more computer processors to execute processes, specified by end-users 150 (or developers 140), to provide analytic and filtering services relating to data received from IoT devices 110. The programming instructions, corresponding to the processes, may be created by developers 140 and end-users 150, using an API (e.g., a RESTful API) that is supported by IoT management platform 130. As previously mentioned, and as will be described in more detail below, IoT management platform 130 may provide for intuitive control of IoT devices 110, such as by associating IoT devices with events corresponding to the devices, allowing for the grouping of events into classes, supporting the assignment of triggers to the events and event classes, and/or supporting the execution of actions based on the triggers.

End-user interface 230 and developer API interface 240 may provide interfaces through which end-users and/or developers can interact with IoT management platform 130. For example, developer API interface may include processes to provide, via a physical interface connected to network 120, a web-based (e.g., HyperText Transfer Protocol (HTTP)) logical interface, in which requests made to a particular Uniform Resource Identifier (URI) may result in a response from IoT management platform 130, such as a text-based response formatted as an Extensible Markup Language (XML) response, HyperText Markup Language (HTML), or JavaScript Object Notation (JSON) response. End-user interface 230 may include one or more processes to provide, via a physical interface connected to network 120, a graphical or visual presentation to end-users, through which the end-users can manage IoT devices 110. In one implementation, the interface may be a web-based interface, such as an HTML interface that is designed to be presented in browsing software that is executed by computing devices of the users.

In a typical use case, a user (e.g., an end-user or developer) may register the IoT devices of the user with IoT management platform 130. For example, users may configure one or more IoT devices to report data sensed by the IoT devices to IoT management platform 130 (e.g., by transmitting the sensor measurements to an IP address associated with IoT management platform 130). The users may similarly register the IoT devices with IoT management platform 130. In this manner, IoT management platform 130 may keep track the IoT devices associated with each particular user. IoT management platform 130 may provide, for example, an IoT "status" graphic dashboard to the users, which may display the current state (e.g., online, not connected, amount of data transmitted by the IoT device in the last hour) of each IoT device of the user and allow the user to manage the operation of the user's IoT devices.

IoT management platform 130 may additionally associate each registered IoT device with the types of data that are received from the IoT device and the type of commands that are accepted by the IoT device. For example, a "camera" IoT device may periodically upload images to IoT management platform 130 while another IoT device may upload temperature measurements and location data (e.g., location coordinate data obtained via GPS measurements). As yet another example, an IOT device for a home security system may include a door sensor that senses the opening and closing of a door and correspondingly uploads, to IoT management platform 130, an indication that the door is open or closed. As yet another example, smartphones or wearable devices may be registered as IoT devices. A smartphone may, for example, upload location information, tilt information (e.g., the tilt orientation of the smartphone, which may be determined/measured by an accelerometer and/or other type of motion sensor), and/or other data.

Incoming data from an IoT device may be logically handled as an "event." As used herein, the term "event" may correspond to a change in the state of one or more measurements of an IoT device. Thus, an event may provide an observation of the underlying resource of IoT management platform 130 (e.g., an observation of an IoT device). For example, for the IoT door sensor, a change in the state of the door (e.g., open to closed, or vice versa) may be processed, by IoT management platform 130, as a "door open/close" event. As another example, each temperature sensor reading that is received from a temperature sensor IoT device may result in a "temperature sensing event." As another example, events may be defined that combine multiple sensor measurements or other events. For example, the "door open/close" event may be an event that is generated by IoT management platform 130 based on multiple sensor readings from one or more IoT devices (e.g., sensor measurements from a motion sensor, an infrared sensor, and a camera installed near a particular door).

In some implementations, IoT management platform 130 may provide a number of standard events to users. For example, a clock may provide the current time, a weather IoT device may provide an estimate of the current outdoor temperature for any location that is within a supported geographical area, etc.

Figure 3:
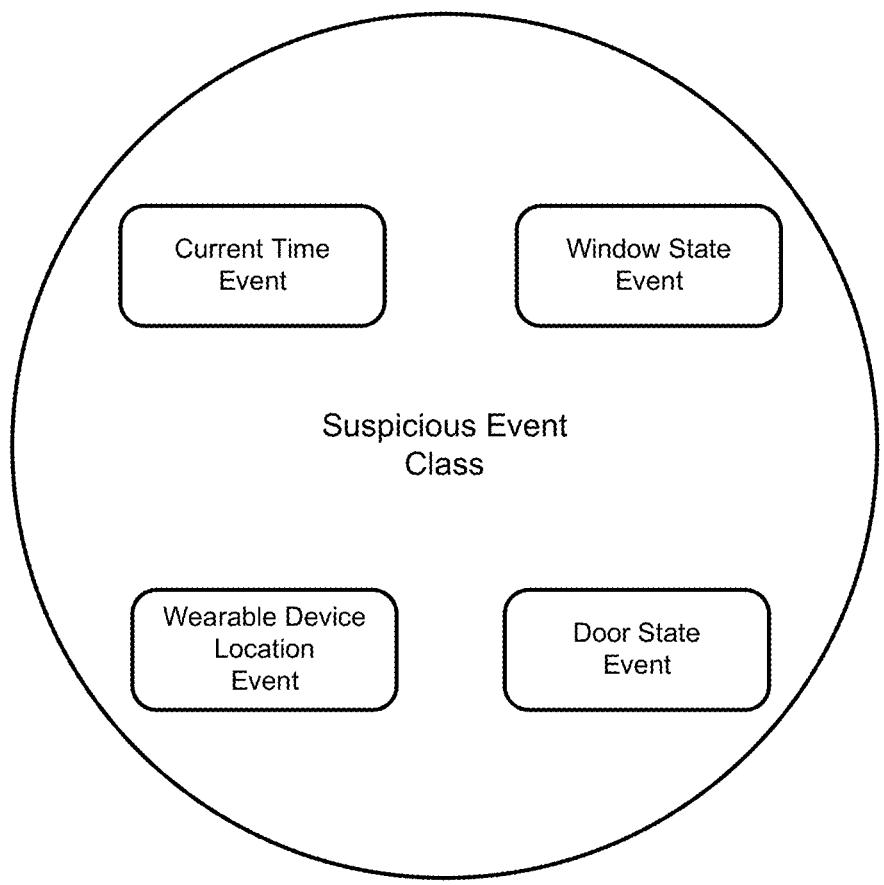
FIG. 3 is a diagram illustrating the grouping of events, for IoT devices registered to a user, into classes.

FIG. 3 is a diagram illustrating the grouping of events, for IoT devices registered to a user, into classes. As shown, an example class, labeled as "Suspicious Event Class," includes the events "Current Time Event," "Window State Event," "Wearable Device Location Event," and "Door State Event." The Current Time Event may represent the current time of day and may be generated by a virtual device maintained by IoT management platform 130. The Window State Event and the Door State Event may be events generated by IoT devices installed in a user's home, such as a window sensor that senses when a window is open or broken, and a door sensor that senses when a particular door is open or closed. The Wearable Device Location Event may correspond to, for example, a wearable device (e.g., a smart watch) that keeps track of the user's location and transmits location data to IoT management platform 130. Via a graphical interface or an API, the user has indicated that these events may be related to group the events into a logical class, and labeled the class as the Suspicious Event Class.

Figure 4:
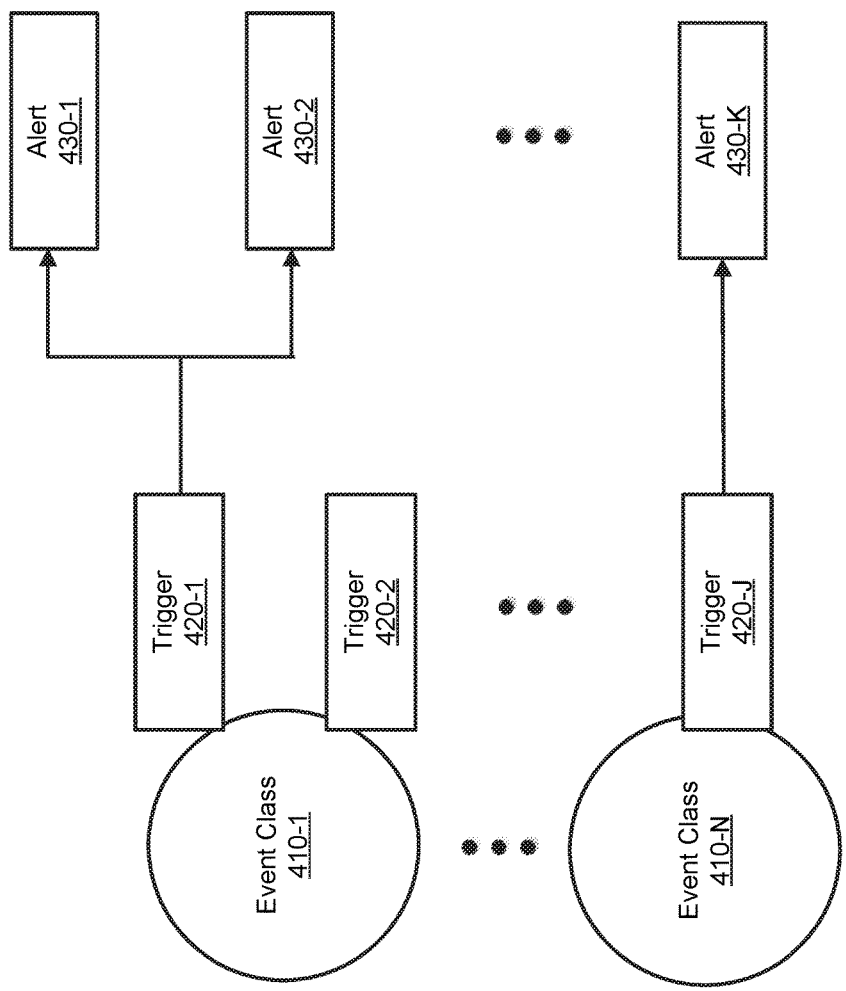
FIG. 4 is a diagram illustrating the concept of triggers and alerts.

FIG. 4 is a diagram illustrating the concept of triggers. A "trigger," as this term is used herein, may refer to a conditional expression that is applied to one or more events. In one implementation, a trigger condition may be an expression that is evaluated using Boolean algebra (i.e., an expression that evaluates to true or false based on the "and", "or", and "not" operators). The evaluation of a trigger may result in the generation of an alert (e.g., if the trigger condition evaluates to True). By logically associating ("subscribing") a trigger to an event class, IoT management platform 130 may manage the execution of the triggers.

As shown in FIG. 4, a number of event classes, event classes 410-1 through 410-N, have been defined. Triggers, labeled as triggers 420-1 through 420-J, are also illustrated. Each trigger 420 is shown as being attached to a particular event class. For example, triggers 420-1 and 420-2 are attached to event class 410-1, and trigger 420-J is attached to event class 410-N. A trigger that is attached to an event class may subscribe (e.g., receive as inputs), the events associated with the event class.

As mentioned, triggers may cause the signaling of alerts, shown as alerts 430-1 through 430-K. Each alert 430 may be associated with a user-defined tag. In some implementations, a trigger may potentially cause the generation of multiple different alerts. For instance, as shown, depending on the conditional outcome of trigger 420-1, either alert 430-1 or alert 430-2 (or both) may be signaled. In some implementations, a trigger may include logic to associate certain data fields with an alert. For example, data corresponding to the events that are input to the trigger may be transformed in some way and associated with the alert as parameter values. The alert, with the parameter values, may be delivered to targets, which may use the parameter values in performing actions.

Similar to event classes, users may associate alerts with alert classes. For instance, via a graphical interface or an API, the user may define a logical event class and may associate (e.g., via a drag and drop operation) one or more alerts with the alert class. An alert class may additionally be associated with targets, where a target may refer to a resource that is to be used when an alert, in the alert class, is signaled.

A target may be associated with an operation or action. For example, an "email" target may send emails using an email resource (e.g., an email server maintained by a user or by IoT management platform 130), an "instant message" target may deliver an instant message or Short Message Service (SMS) message to be sent. Other targets may cause audible or visual feedback to be sent to a user (e.g., the user's smart phone or computer may emit a sound or play a video). As another example, a target may cause IoT management platform 130 to programmatically transmit data or communicate with an application server 160. For example, a target for a vending machine company may cause IoT management platform 130 to update a database, implemented by an application server 160, to indicate that the inventory of a particular product for a particular vending machine is depleted.

In some implementations, IoT management platform 130 may provide a number of standardized targets that may be used to implement actions, such as transmit an email, send an instant message, access a URI via HTTP, etc. Users may thus conveniently reuse these targets by simply attaching the targets (e.g., via a graphical interface or via a textual interface (such as a RESTful web interface)) to alert classes and then customizing any particular parameters associated with the targets (e.g., an email address, an SMS number, etc.). Alternatively or additionally, IoT management platform 130 may allow users to customize more sophisticated actions using a general-purpose programming language.

Figure 5:
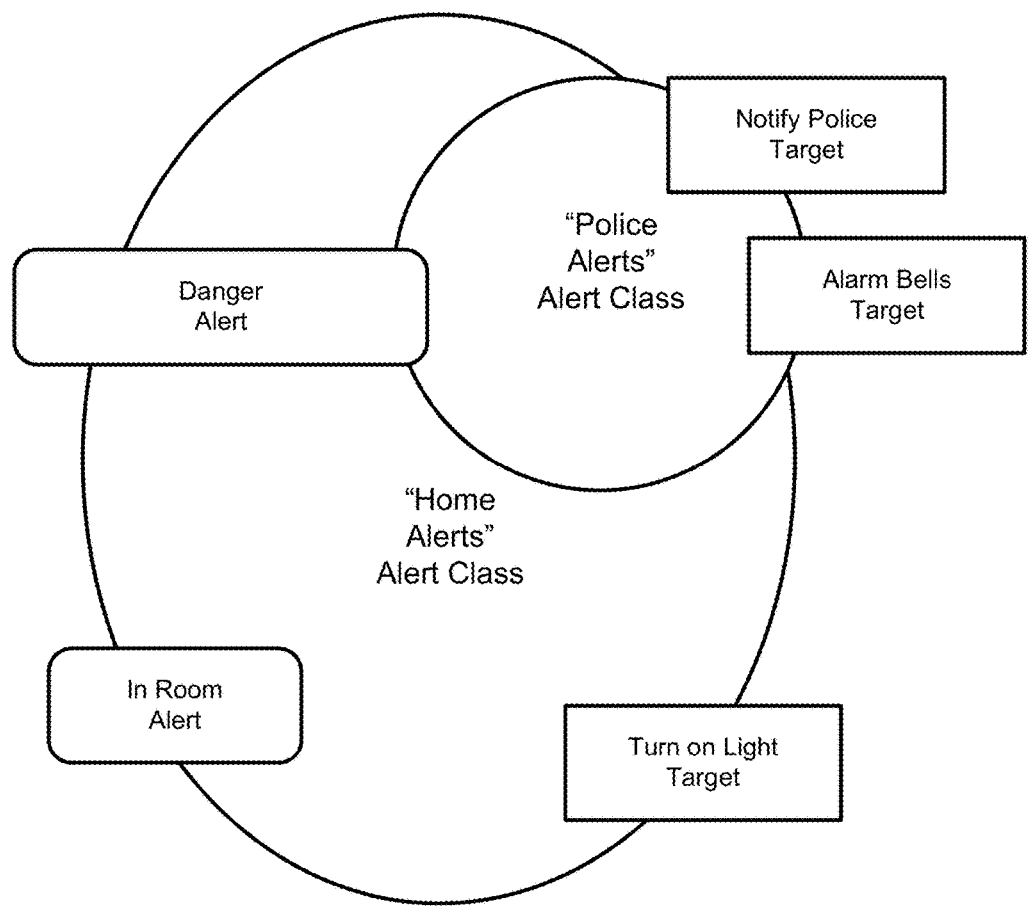
FIG. 5 is a diagram illustrating the grouping of alerts and targets into an alert class.

FIG. 5 is a diagram illustrating the grouping of alerts and targets into an alert class. In FIG. 5, alerts are illustrated using rectangles with rounded corners and targets are illustrated using rectangles with square corners. As shown, the example alert class, labeled as "Home Alerts," may be created by a user to group alerts that relate to events associated with the user's home. Another example alert class, labeled as "Police Alerts," may also be defined to overlap with Home Alerts. Alerts may be associated with the alert classes. For example, the alert "In Room" may be an alert that is signaled by one or more triggers and generally indicates that the user is at home and in a room of the home. The "Danger" alert may be an alert that is signaled by one or more triggers and that indicates that there is a dangerous condition associated with the user's home (e.g., an intruder). The In Room alert may be a member of the Home Alerts alert class and the Danger alert may be a member of both the Home Alerts and Police Alerts alert classes.

A number of targets are also illustrated, in FIG. 5, as being associated with the illustrated alert classes. For example, the target "Turn on Light" may be correspond to a remote controlled light switch that is activated whenever an alert is signaled for the Home Alerts class (e.g., whenever an In Room or Danger alert is signaled). The targets "Notify Police" and "Alarm Bells" may be activated whenever the Danger alert is signaled. The Notify Police target may correspond to, for example, a resource that is used to automatically send a distress message to a local police station (e.g., an SMS resource that includes parameters that cause a message to be sent to the police with a message that indicates police help may be needed at the address of the home). The Alarm Bells target may be correspond to a remote controlled alarm.

In general, a target, when defined by a user, may refer to a particular resource and one or more parameters describing how that resource is to be used (e.g., for an SMS resource, an SMS address and message). When a target is activated, a corresponding action is typically taken.

Using the concepts described with reference to FIGS. 4 and 5, relating to event classes, triggers, alerts, alert classes, and targets, a user may be able to group machine centric events, then filter, correlate and convert the events into human readable alerts, which may subsequently be routed to any number of delivery channels or behaviors. Advantageously, a simple and intuitive programming model may be used to manage and control the IoT devices associated with a user. The definition and programming of the event classes, triggers, alerts, and targets, may be implemented via a textual and/or graphical interface, such as one provided by IoT management platform 130 (e.g., a programming interface provided through web browser) or via downloadable application that may be run on computing devices of the user.

Figure 6:
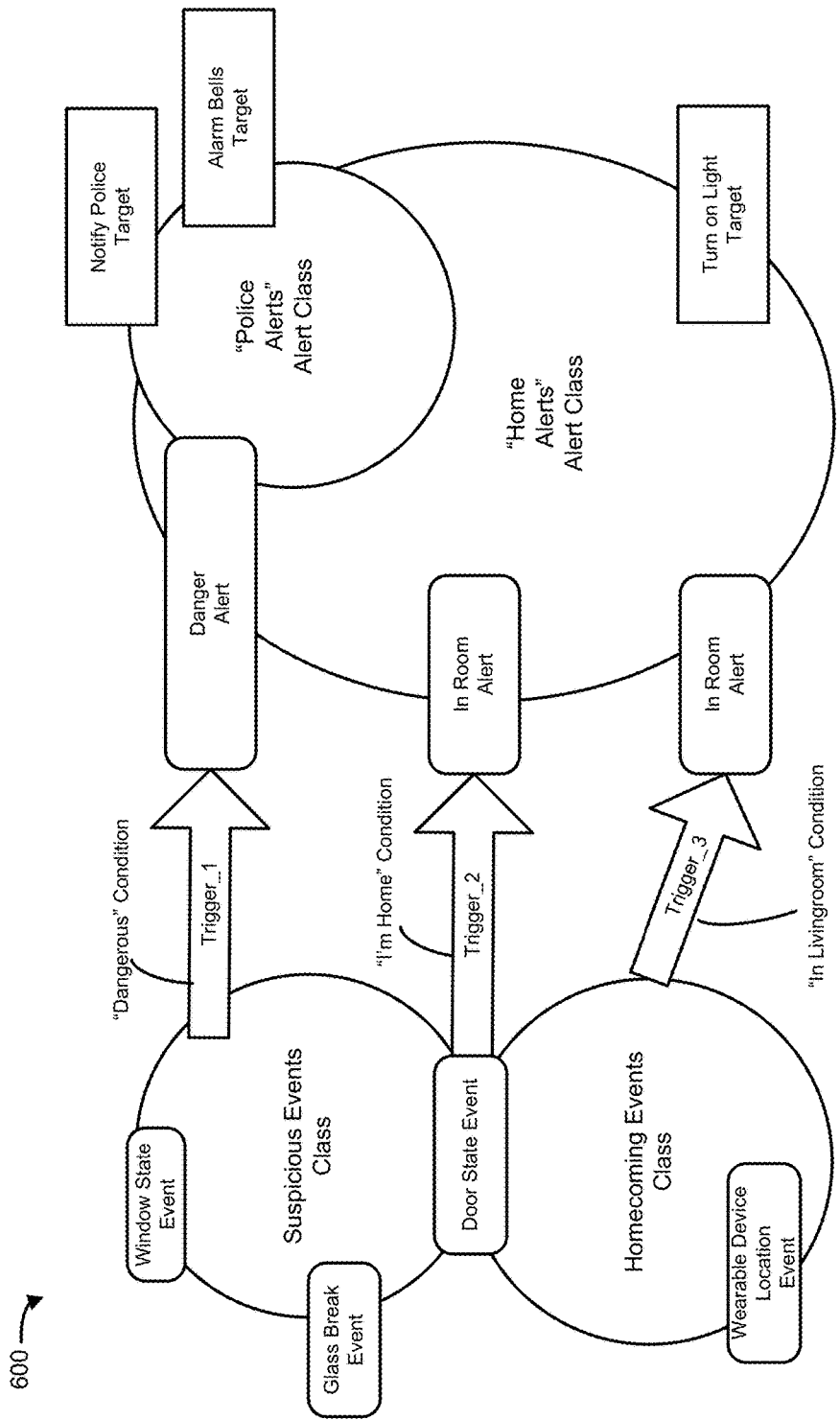
FIG. 6 is a diagram of an example graphical interface illustrating the concepts described with respect to FIGS. 4 and 5.

FIG. 6 is a diagram of an example graphical interface 600 illustrating the concepts described with respect to FIGS. 4 and 5. Graphical interface 600 may be displayed, for example, via a web browser of a user or via a personal computing device of the user. Graphical interface 600 may provide an intuitive and understandable interface through which users can manage and program triggers and alerts.

As shown, in the example of FIG. 6, a user has defined two event classes, the Suspicious Events Class and the Homecoming Events Class. Each class may be defined by associating a number of events into each class. The events may be events that are available to the user based on the IoT devices 110 that are associated with the user (e.g., IoT devices owned or operated by the user). In this example, for the Suspicious Events Class, the events include a Window State Event, a Glass Break Event, and a Door State Event. The Window State Event may be provided by an IoT device that monitors the open/close/broken state of a window. For example, the IoT device may notify IoT management platform 130 whenever a monitored window is open or broken. Similarly, the Door State Event may be activated when a door, monitored by an IoT device, is opened. The Glass Break Event may be provided by an IoT device that includes a microphone. The event may be generated, by IoT management platform 130, when the sound recorded by the IoT matches the sound of glass breaking.

As shown, the Homecoming Events Class may also include the Door State Event. In this manner, defined events may be reused. As is further shown in FIG. 6, the Homecoming Events Class also includes the Wearable Device Location Event, which may be based on location updates relating to a wearable device (e.g., a smartwatch) that is worn by a user.

Three defined triggers are illustrated in FIG. 5: trigger_1, trigger_2, and trigger_3. Trigger_1 may use, as inputs, one or more events from the Suspicious Events Class and may be defined using conditional logic to implement an expression based on the Glass Break Event, the Window State Event, and the Door State Event. The expression may correspond to a trigger that is activated when a sound is heard and the door or window is open. As an example, in pseudocode, trigger_1 may be expressed as: "glassBreak=True and (windowDetector='open' or doorDetector='open')".

When trigger_1 evaluates to true, an intruder may be present and the Danger may be signaled. As discussed with respect to FIG. 5, the Danger alert is associated with the Notify Police target, the Alarm Bells target, and the Turn on Light target.

Trigger_2, as is also shown in FIG. 5, may be based on data from the Homecoming Events class, which may be defined as a class that may include events that tend to relate to the user entering the user's home. The Door State event may be shared between both the Suspicious Events class and the Homecoming Events class. For example, trigger_2 may activate when the door is opened (based on the Door State Event) and the user's current location is in or near the user's home (based on the Wearable Device Location Event). In this situation, the I'n Room alert may be signaled, which, as shown, may result in execution of the Turn on Light target.

The last trigger shown in FIG. 6, trigger_3, may also be based on data from the Homecoming Events class. For example, trigger_3 may activate when the user's location (based on the Wearable Device Location Event) is in the living room of the user's home. Successful evaluation of trigger_3 may result in the signaling of the In Room alert. As previously mentioned, alerts, events, and targets, such as the In Room event, may be reused by a user.

Through graphical interface 600, a user may visualize, create, combine, and reuse events, triggers, alerts, and targets. Although not explicitly shown, graphical interface 600 may provide commands through which a user can define new triggers, classes, alerts, and targets. Additionally, based on the IoT devices associated or assigned to a user's account, IoT management platform 130 may provide a number of standardized events, triggers, and targets. For example, IoT management platform 130 may maintain a database of IoT devices. The database may include the types of events that are available for each of the IoT devices in the database. These events, along with standardized actions, triggers, and/or alerts, may be provided to the user as a "toolbox" of possible operations. In some implementations, graphical interface 600 may enable the user to graphically drag operations from the toolbox to the interface. For example, the user may graphically place various target icons on a particular alert class to cause the corresponding target to be used in response to the alert.

As mentioned, a user may also define custom event classes, triggers, alert classes, alerts, and targets. For example, an "I'm Home" trigger/alert may be defined using a textual expression such as: "smartwatch/fields/location=/places/home".

The flexibility of the design pattern discussed above allows a user to reuse events, triggers, alerts, and targets for different scenarios and actions, intuitively combining applications without developer assistance. For example, end-users 150 may tend to use IoT management platform 130 to create classes of events, attach various pre-created targets to alert classes, and define or modify relatively simple trigger conditions. Developers 140 may tend to create more complex trigger conditions or for eventual use by end-users 150.

Figure 7:
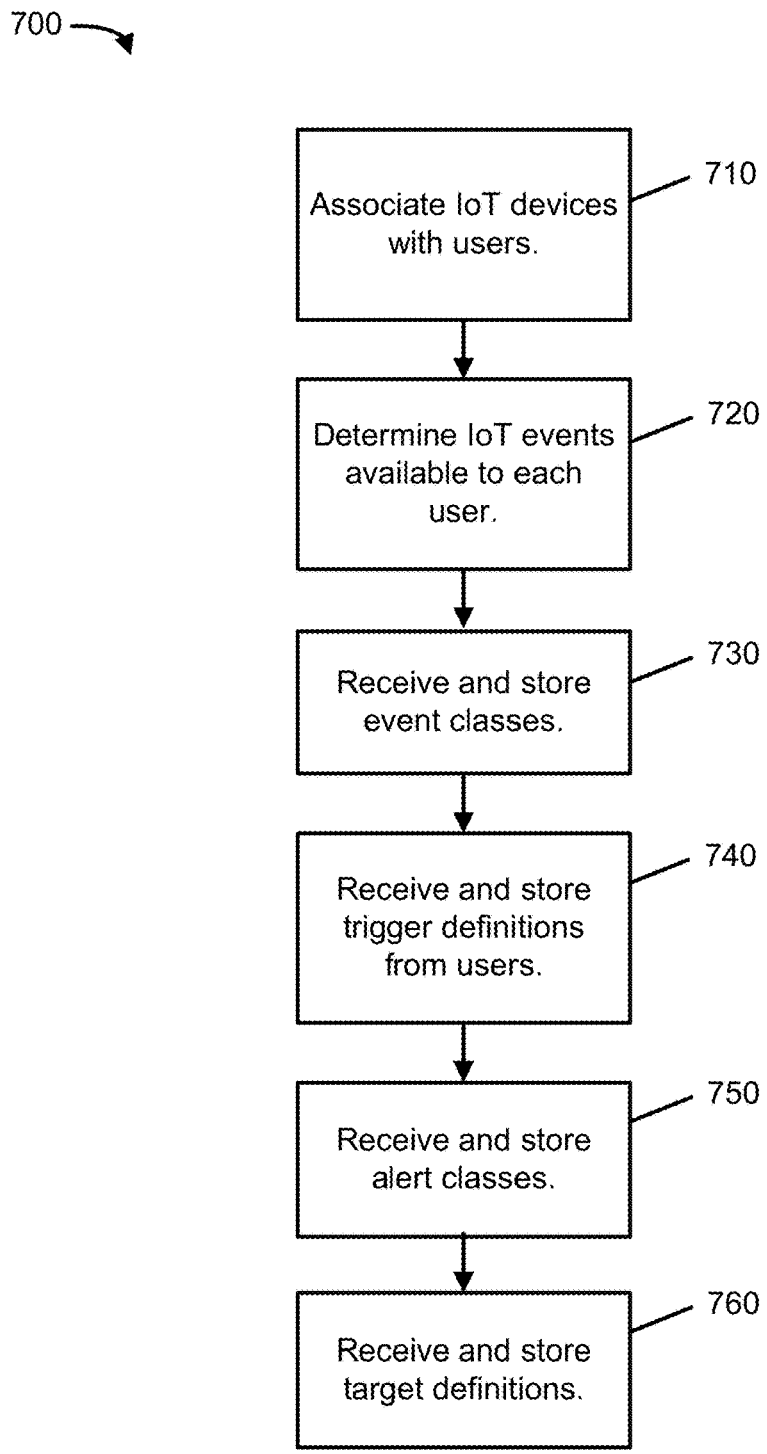
FIG. 7 is a flowchart illustrating an example process relating to setting up of IoT monitoring for a user.

FIG. 7 is a flowchart illustrating an example process 600 relating to setting up of IoT monitoring for a user. The operations of process 700 may be performed, for example, by IoT management platform 130.

Process 700 may include associating IoT devices with users (block 710). In one implementation, a user may register or otherwise provision IoT devices 110, that are owned or operated by the user, with IoT management platform 130. For example, a user may identify an IoT device and/or label the type of data the is provided by the IoT device. In one implementation, a RESTful API may be used, by IoT management platform 130, to receive the IoT device registration information. In this way, IoT management platform 130 may maintain, for each user, a list of the IoT devices associated with the user.

Process 700 may further include determining IoT events available to each user (block 720). The IoT events available for each user may be based on the IoT devices associated with the user and the types of data transmitted by the devices. For example, each IoT event, that is available for a particular user, may be based on the state or change of state of the received data for the particular IoT device. For example, for an IoT device that measures temperature and periodically uploads corresponding temperature measurements to IoT management platform 130, a "temperature update event" may be generated by IoT management platform 130 each time a temperature measurement is received. As another example, IoT events may be generated by IoT management platform 130 based on processing applied to raw IoT data. For example, an IoT camera device may stream images to IoT management platform 130, and IoT management platform 130 may perform image processing on the images to generate an event based on a result of the processing (e.g., a "motion detected" event may be generated whenever motion is detected in a series of the images). As with IoT device registration, a RESTful API may be used to determine the IoT events available to each user.

Process 700 may further include receiving and storing event classes (block 730). As previously mentioned, users may associate IoT events into event classes. An event class may make the visualization of the user's IoT devices, and application of triggers, to the IoT events, intuitive. The indications of which events are to be associated with classes may be received, by IoT management platform 130, through a graphical interface presented by IoT management platform 130 or via a RESTful interface.

Process 700 may further include receiving and storing trigger definitions from users (block 740). As previously mentioned, a trigger may be a conditional expression that is evaluated using one or more of the IoT events that are available to the user. In this manner, a number of reusable triggers may be defined for the user accounts.

Process 700 may further include receiving and storing alert classes (block 750). Users may assign alerts and triggers to an alert class. An alert class may make the visualization of the operations, that are to be performed in response to IoT events, intuitive. The indications of which alerts, and which triggers, are to be associated with an alert class may be received, by IoT management platform 130, through a graphical interface presented by IoT management platform 130 or via a RESTful interface.

Process 700 may further include receiving and storing target definitions (block 760). In general, a target may be defined as a resource that performs operations, and one or more parameters or other customization information used to control the resource. The actions available to a user (performed by a target) may include a number of standardized actions (e.g., send an email or SMS to a particular address, access a particular web address, present an audible or visual alert) and/or user-customized actions.

Figure 8:
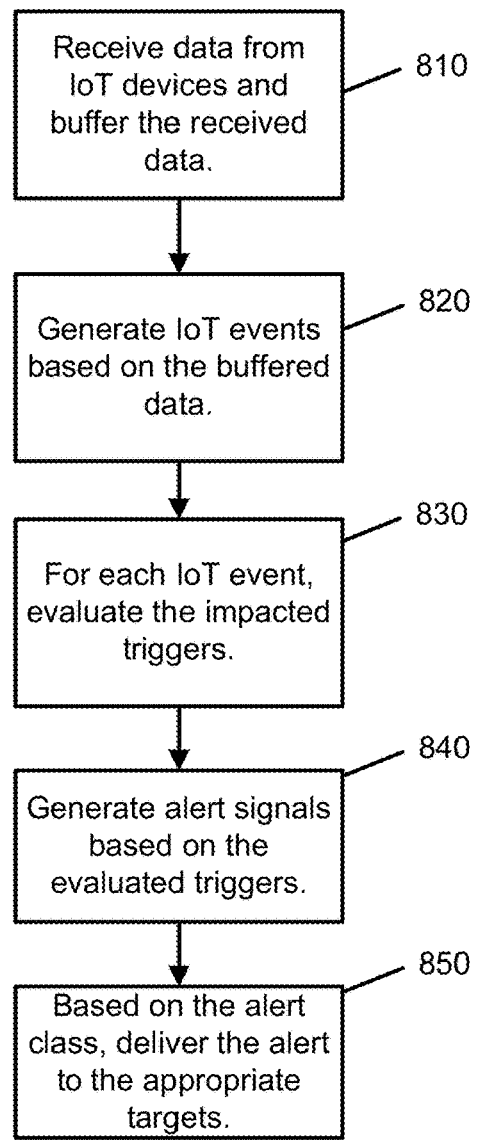
FIG. 8 is a flowchart illustrating an example process relating to event processing for IoT devices.

FIG. 8 is a flowchart illustrating an example process 800 relating to event processing for IoT devices. The operations of process 800 may be performed, for example, by IoT management platform 130.

Process 800 may include receiving data from IoT devices and buffering the received data (block 810). The received data may include, for example, measurements and/or observations relating to the environment of the IoT device. IoT management platform 130 may buffer the received data, on the behalf of users, until a later time. In particular, IoT management platform 130 may forward the buffered data to users that are connected to IoT management platform 130 (block 820). IoT management platform 130 may designed to include redundant components to function as a reliable data collection and buffering point for users.

Process 800 may further include determining, based on the received and buffered data, IoT events (block 830). As previously mentioned, the IoT events available for each user may be based on the IoT devices associated with the user and the types of data transmitted by the devices.

For each IoT event, IoT management platform 130 may evaluate any triggers that are impacted by the event (block 830). When the evaluation of the trigger indicate that one or more alerts should be signaled, IoT management platform 130 may generate the corresponding alert signals (block 840). In particular, each generated alert signal may be delivered to the targets that are a member of the alert class to which the alert is a member (block 850).

Figure 9:
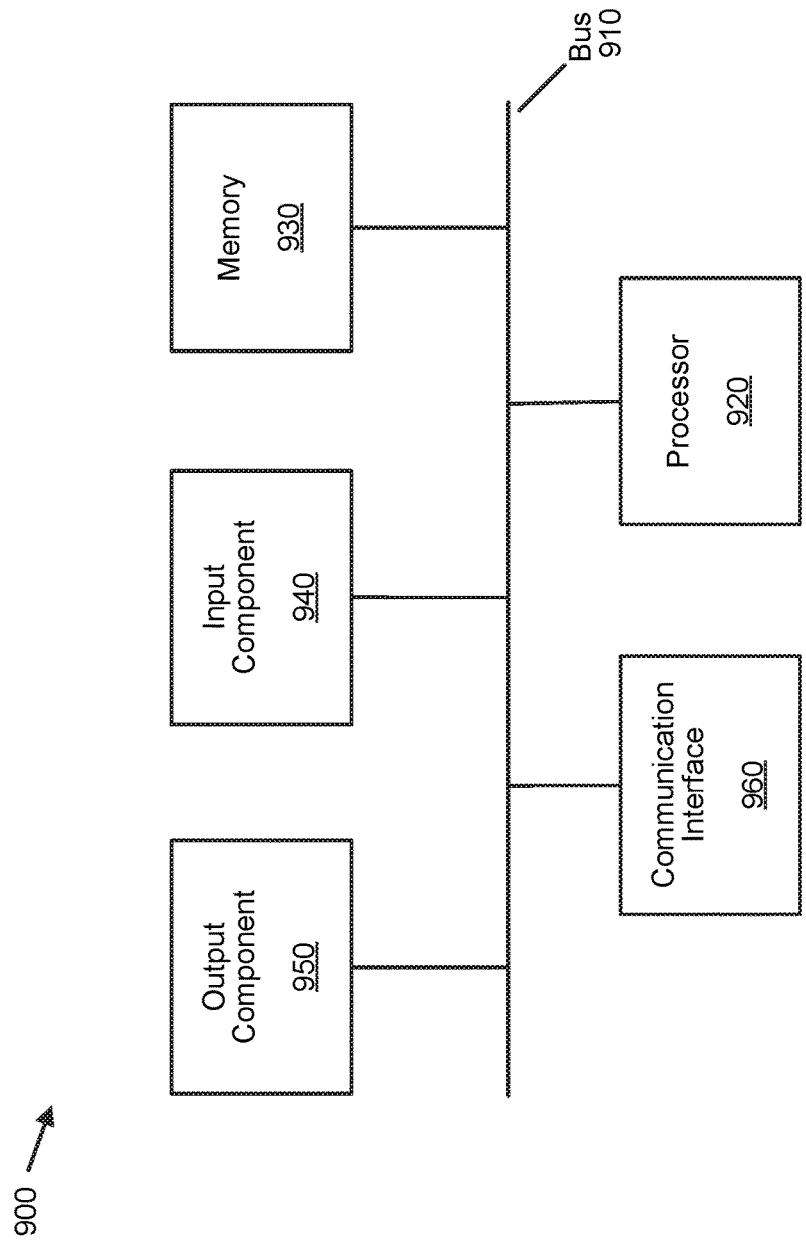
FIG. 9 is a diagram of example components of a device, such as an IoT device, a user computing device, or a server computing device.

FIG. 9 is a diagram of example components of a device 900, such as an IoT device, a user computing device, or a server computing device. Each of the devices illustrated in FIGS. 1 and 2 may include one or more devices 900. Device 900 may include bus 910, processor 920, memory 930, input component 940, output component 950, and communication interface 960. In another implementation, device 900 may include additional, fewer, different, or differently arranged components. For example, device 900 may include one or more sensors are used to measure the environment relating to device 100. As described herein, a component may be implemented by hardware circuitry, software logic, and/or some combination thereof.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes (LEDs), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope set forth in the claims that follow. The specification and drawings are accordingly to be regarded in an illustrative rather than restrictive sense.

For example, while a series of lines, arrows, and/or blocks have been described with regard to FIGS. 7 and 8, the order of the blocks and arrangement of the lines and/or arrows may be modified in other implementations. Further, non-dependent blocks may be performed in parallel. Similarly, while series of communications have been described with regard to several of the Figures provided herein, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operations and behaviors of the aspects that were described without reference to the specific software code—it being understood that software and control hardware could be designed to implement the aspects based on the description herein.

Further, certain portions may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection" of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. An Internet of Things (IoT) system comprising:
   an interface to receive data from a plurality of IoT devices associated with a plurality of different users;
   a non-transitory computer-readable medium containing program instructions; and
   one or more processors to execute the program instructions to:
      present, via a graphical user interface (GUI), a first graphical element that represents an event, the event corresponding to a state or change of state of a particular IoT device;
      present, via the GUI, a second graphical element that represents an event class;
      receive, via the GUI, an indication that the event is associated with the event class, wherein receiving the indication includes:
         detecting a first drag and drop operation, in which the first graphical element is selected and moved to a first location, in the GUI, that is proximate to the second graphical element;
      receive information specifying a particular trigger associated with the event, the particular trigger including one or more conditions relating to the state or change of state of the particular IoT device;
      present, via the GUI, a third graphical element that represents an alert class;
      receive, via the GUI, an indication that the alert class is associated with the particular trigger;
      present, via the GUI, a fourth graphical element that represents a particular action to take when a given trigger, associated with the alert class, is satisfied;

receive, via the GUI, an indication that the particular action is associated with the alert class, wherein receiving the indication includes:
  detecting a second drag and drop operation, in which the fourth graphical element is selected and moved to a second location, in the GUI, that is proximate to the third graphical element;
store, for the particular IoT device, of the plurality of IoT devices, information regarding the event, the event class, the particular trigger, and the alert class associated with the particular IoT device, as received via the GUI;
determine, in response to the received data, that the one or more conditions specified in the stored particular trigger have been satisfied;
identify, based on the determination that the one or more conditions specified in the particular trigger have been satisfied, that the alert class is associated with the satisfied particular trigger; and
perform, based on the identification of the alert class, each action associated with the alert class, including the particular action, wherein performing the action includes:
  determining one or more targets associated with the particular alert class; and
  delivering an indication of the action to the one or more targets.

2. The system of claim 1, wherein executing the program instructions further causes the one or more processors to:
receive, from a particular user of the plurality of users, registration information to register IoT devices that are owned or maintained by the particular user with an account of the particular user.

3. The system of claim 1, wherein the one or more targets include resources to:
transmit an email or text message; or
control one or more IoT devices associated with a same user as a user that is associated with the particular IoT device.

4. The system of claim 1, wherein the indications, received via the GUI, are performed through a Representational State Transfer (REST) Application Programming Interface (API).

5. The IoT system of claim 1, wherein the particular action is a first action, wherein the alert class is associated with at least a second action, wherein executing the program instructions, to perform each action associated with the alert class, further causes the one or more processors to:
perform the second action, based on determining that the particular trigger, associated with the alert class, has been satisfied.

6. The IoT system of claim 1, wherein the event class is a first event class, wherein executing the program instructions further causes the one or more processors to:
present, via the GUI, a second event class; and
receive an indication that the event is associated with both the first event class and the second event class.

7. The IoT system of claim 6, wherein the indication, that the event is associated with both the first event class and the second event class, includes a third drag and drop operation, in which the first graphical element is moved to a third location, in the GUI, that is proximate to (a) the second graphical element and (b) a fifth graphical element that represents the second event class.

8. A method comprising:
presenting, via a graphical user interface (GUI), a first graphical element that represents an event, the event corresponding to a state or change of state of a particular IoT device;
presenting, via the GUI, a second graphical element that represents an event class;
receiving, via the GUI, an indication that the event is associated with the event class, wherein receiving the indication includes:
  detecting a first drag and drop operation, in which the first graphical element is selected and moved to a first location, in the GUI, that is proximate to the second graphical element;
receiving information specifying a particular trigger associated with the event, the particular trigger including one or more conditions relating to the state or change of state of the particular IoT device;
presenting, via the GUI, a third graphical element that represents an alert class;
receiving, via the GUI, an indication that the alert class is associated with the particular trigger;
presenting, via the GUI, a fourth graphical element that represents a particular action to take when a given trigger, associated with the alert class, is satisfied;
receiving, via the GUI, an indication that the particular action is associated with the alert class, wherein receiving the indication includes:
  detecting a second drag and drop operation, in which the fourth graphical element is selected and moved to a second location, in the GUI, that is proximate to the third graphical element;
storing, for the particular IoT device, of the plurality of IoT devices, information regarding the event, the event class, the particular trigger, and the alert class associated with the particular IoT device, as received via GUI;
determining that the particular trigger has been satisfied, based on detecting that the one or more conditions, relating to the state or change of state of the particular IoT device have been satisfied;
performing, based on the identification of the alert class, each action associated with the alert class, including the particular action, wherein performing the action includes:
  determining one or more targets associated with the particular alert class; and
  delivering an indication of the action to the one or more targets.

9. The method of claim 8, further comprising:
receiving, from a particular user, registration information to register IoT devices that are owned or maintained by the particular user with an account of the particular user.

10. The method of claim 8, wherein the one or more targets include resources to:
transmit an email or text message; or
control an IoT device associated with the particular user.

11. The method of claim 8, wherein the indications, received via the GUI, are performed through a Representational State Transfer (REST) Application Programming Interface (API).

12. The method of claim 8, wherein the particular action is a first action, wherein the alert class is associated with at least a second action, wherein performing each action associated with the alert class includes:

performing the second action, based on determining that the particular trigger, associated with the alert class, has been satisfied.

13. The method of claim 8, wherein the event class is a first event class, the method further comprising:
presenting, via the GUI, a second event class; and
receiving an indication that the event is associated with both the first event class and the second event class, wherein the indication includes a third drag and drop operation, in which the first graphical element is moved to a third location, in the GUI, that is proximate to (a) the second graphical element and (b) a fifth graphical element that represents the second event class.

14. A non-transitory computer-readable medium containing program instructions, that when executed by one or more processors, cause the one or more processors to:
present, via a graphical user interface (GUI), a first graphical element that represents an event, the event corresponding to a state or change of state of a particular IoT device;
present, via the GUI, a second graphical element that represents an event class;
receive, via the GUI, an indication that the event is associated with the event class, wherein receiving the indication includes:
detecting a first drag and drop operation, in which the first graphical element is selected and moved to a first location, in the GUI, that is proximate to the second graphical element;
receive information specifying a particular trigger associated with the event, the particular trigger including one or more conditions relating to the state or change of state of the particular IoT device;
present, via the GUI, a third graphical element that represents an alert class;
receive, via the GUI, an indication that the alert class is associated with the particular trigger;
present, via the GUI, a fourth graphical element that represents a particular action to take when a given trigger, associated with the alert class, is satisfied;
receive, via the GUI, an indication that the particular action is associated with the alert class, wherein receiving the indication includes:
detecting a second drag and drop operation, in which the fourth graphical element is selected and moved to a second location, in the GUI, that is proximate to the third graphical element;
store, for the particular IoT device, of the plurality of IoT devices, information regarding the event, the event class, the particular trigger, and the alert class associated with the particular IoT device, as received via the GUI;
determine that the particular trigger has been satisfied, based on detecting that the one or more conditions, relating to the state or change of state of the particular IoT device have been satisfied;
perform, based on the identification of the alert class, each action associated with the alert class, including the particular action, wherein performing the action includes:
determining one or more targets associated with the particular alert class; and
deliver an indication of the action to the one or more targets.

15. The non-transitory computer-readable medium of claim 14, wherein the program instructions further cause the processors to:
receive, from a particular user, registration information to register IoT devices that are owned or maintained by the particular user with an account of the particular user.

16. The non-transitory computer-readable medium of claim 14, wherein the one or more targets include resources to:
transmit an email or text message; or
control an IoT device associated with the particular user.

17. The non-transitory computer-readable medium of claim 14, wherein the indications, received via the GUI, are performed through a Representational State Transfer (REST) Application Programming Interface (API).

18. The non-transitory computer-readable medium of claim 14, wherein the particular action is a first action, wherein the alert class is associated with at least a second action, wherein the program instructions, to perform each action associated with the alert class, further cause the one or more processors to:
perform the second action, based on determining that the particular trigger, associated with the alert class, has been satisfied.

19. The non-transitory computer-readable medium of claim 14, wherein the event class is a first event class, wherein the processor-executable instructions further include program instructions to:
present, via the GUI, a second event class; and
receive an indication that the event is associated with both the first event class and the second event class.

20. The non-transitory computer-readable medium of claim 19, wherein the indication, that the event is associated with both the first event class and the second event class, includes a third drag and drop operation, in which the first graphical element is moved to a third location, in the GUI, that is proximate to (a) the second graphical element and (b) a fifth graphical element that represents the second event class.

* * * * *